United States Patent [19]

Rody et al.

[11] 4,234,707
[45] Nov. 18, 1980

[54] POLYMERIC LIGHT STABILIZERS FOR PLASTICS

[75] Inventors: Jean Rody, Basel; Erwin Nikles, Liestal, both of Switzerland

[73] Assignee: Ciba-Geigy Corporation, Ardsley, N.Y.

[21] Appl. No.: 956,715

[22] Filed: Nov. 1, 1978

[30] Foreign Application Priority Data

Nov. 10, 1977 [CH] Switzerland ............ 13722/77

[51] Int. Cl.³ .................................... C08G 63/76
[52] U.S. Cl. ........................ 525/437; 260/45.8 R;
525/420; 525/453; 525/523; 525/540; 525/328; 528/289; 528/291
[58] Field of Search ............ 525/443, 420, 437, 453, 525/523, 540; 528/289, 291; 260/45.8 R; 526/15

[56] References Cited

U.S. PATENT DOCUMENTS

| | | | |
|---|---|---|---|
| 3,035,025 | 5/1962 | Broadhead et al. | 528/289X |
| 3,910,860 | 10/1975 | Tanikella | 528/289 X |
| 3,974,127 | 8/1976 | Tanikella | 528/289 |
| 4,001,189 | 1/1977 | Tanikella et al. | 528/289 |
| 4,001,190 | 1/1977 | Tanikella et al. | 528/289 |
| 4,079,045 | 3/1978 | Lazarus et al. | 528/289 X |
| 4,096,123 | 6/1978 | Niinami et al. | 528/289 |

*Primary Examiner*—Lucille M. Phynes
*Attorney, Agent, or Firm*—Wenderoth, Lind & Ponack

[57] ABSTRACT

Blocking of the end groups of condensation and addition polymers which can be used as light stabilizers and in which the recurring structural unit contains a polyalkylpiperidine residue of the formula

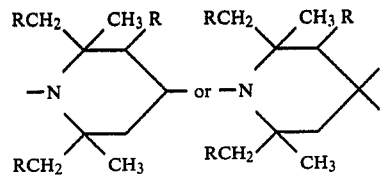

or is substituted by a polyalkylpiperidine side group of the formula

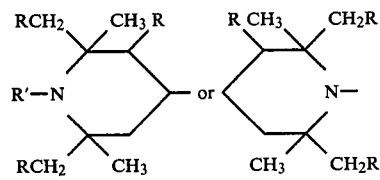

in which R is hydrogen or alkyl having 1–5 C atoms and R' is hydrogen, alkyl having 1–12 C atoms, alkeny having 3–8 C atoms, alkynyl having 3–6 C atoms, aralkyl having 7–12 C atoms, alkanoyl having 1–8 C atoms or alkenoyl having 3–5 C atoms, is effected by adding a monofunctional compound during the preparation of the polymers, or by reacting the polymer, after it has been prepared, with a monofunctional compound. Examples of monofunctional compounds are monocarboxylic acids, monoalcohols, monoamines or monoisocyanates. The polymeric light stabilizers become more stable as a result of the blocking of the end groups.

8 Claims, No Drawings

POLYMERIC LIGHT STABILIZERS FOR PLASTICS

German Offenlegungsschrift No. 2,719,131 describes condensation and addition polymers, the recurring structural unit of which contains a polyalkylpiperidine residue of the formula

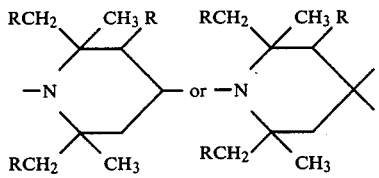

or is substituted by a polyalkylpiperidine side group of the formula

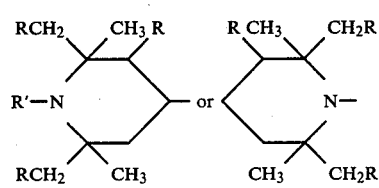

in which R is hydrogen or alkyl having 1-5 C atoms and R' is hydrogen, alkyl having 1-12 C atoms, alkenyl having 3-8 C atoms, alkynyl having 3-6 C atoms, aralkyl having 7-12 C atoms, alkanoyl having 1-8 C atoms or alkenoyl having 3-5 C atoms, and also copolymers thereof with one another or with polyalkylpiperidine-free components, which polymers and copolymers can be used as light stabilisers for plastics.

Preferably, the polymers which can be used as light stabilisers and are claimed in the said patent application are polyesters, polyamides, polyurethanes, polyureas, polysilyl esters, polyethers, polyamines, polycarbonates and their copolymers, in which the recurring unit in the molecule contains a polyalkylpiperidine residue, and especially those polymers which can be represented by the general formulae I–VII

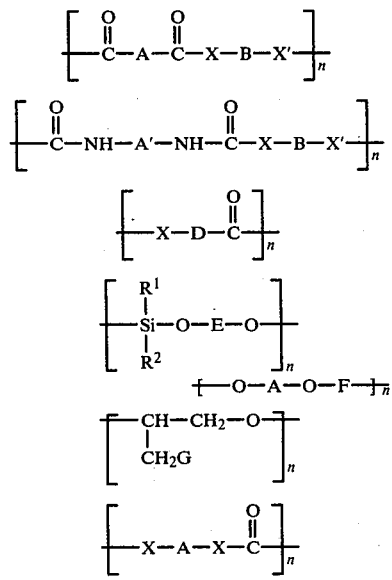

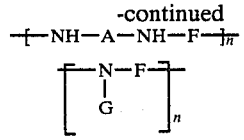

in which X and X' are oxygen or NY, Y is hydrogen, alkyl, cycloalkyl, aralkyl, aryl or a polyalkylpiperidine radical, $R_1$ and $R_2$ are methyl, ethyl or phenyl, A, A', B, B', D, E and F are divalent organic radicals and G is a monovalent organic radical, at least one of the radicals Y, A, A', B, B', D, E, F and G containing a polyalkylpiperidine residue in each of the formulae I to VII. The index n is a value of 2–50, so that the polymers are those of relatively low molecular weight. If these polymers are linear, they carry end groups which in the main correspond to the functional groups of the starting materials used for their preparation. For example, polyesters which are prepared from diols and dicarboxylic acids have hydroxyl and carboxyl end groups. Depending on the molar ratio of the components used, the end groups in these polyesters can be mainly hydroxyl groups or mainly carboxyl groups, or the two types of end groups are present in about the same numbers. Other types of end groups which can be present in the polymers of the formulae I to VII are amino groups, lower alkyl-carboxylate groups, halogen groups, isocyanate groups or epoxy groups. Such end groups can have an adverse effect when the polymers are used as light stabilisers in plastics, in particular when the degree of polymerisation n is low and the proportion of end groups is thus relatively high. During the shaping processing of the plastics stabilised with these polymeric light stabilisers, temperatures can arise at which the end groups are no longer stable. An undesired reaction with the plastic can also occur or a partial decomposition of the polymeric light stabiliser can take place. As a result of this, discolorations can arise, the light stabilising action can be reduced or the properties of the plastics can be changed.

In a further development of the invention described in German Offenlegungsschrift No. 2,719,131 it has been found that the adverse effects of such end groups can be eliminated by blocking the end groups, during or after the preparation of the polymers, by the addition of compounds which react monofunctionally with the end groups. For example, in the case of a polyester which carries both hydroxyl and carboxyl groups, the hydroxyl groups can be blocked by allowing the polyester to react, after it has been prepared, with a monocarboxylic acid or a functional derivative thereof, (for example the acid chloride or acid anhydride), or by adding a small amount of a monocarboxylic acid or a derivative thereof during the preparation of the polyester from a dicarboxylic acid and a diol. Analogously, amino groups can also be blocked by monocarboxylic acids or functional derivatives thereof.

Hydroxyl groups and amino groups can, however, also be blocked by monochlorotriazines, by monoepoxides or by monoisocyanates. Isocyanate end groups and epoxide end groups can be blocked by monoalcohols or by primary or secondary monoamines. Halogen end groups can be blocked by monoamines, by alkali metal alkoxides or by trialkyl phosphites.

Cyclic anhydrides of dicarboxylic acids can also react monofunctionally towards primary amino groups by forming a cyclic imide group.

If the blocking of the end groups is carried out by adding a monofunctional compound during the preparation of the polymeric light stabilisers, the molecular weight of the products can be regulated by this means. This can be of technical interest when it is desired to obtain a product of restricted molecular weight. However, this is also of interest in order to obtain products of constant molecular weight from the industrial preparation of such light stabilisers.

The subject of the invention is therefore a process for blocking the end groups of condensation and addition polymers which can be used as light stabilisers and in which the recurring structural unit contains a polyalkylpiperidine residue of the formula

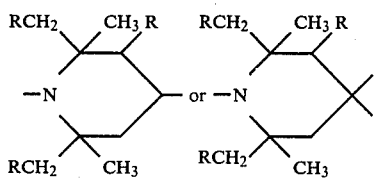

or is substituted by a polyalkylpiperidine side group of the formula

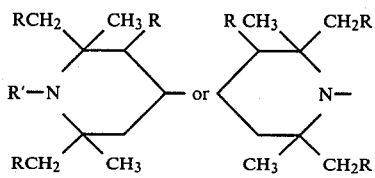

in which R is hydrogen or alkyl having 1-5 C atoms and R' is hydrogen, alkyl having 1-12 C atoms, alkenyl having 3-8 C atoms, alkynyl having 3-6 C atoms, aralkyl having 7-12 C atoms, alkanoyl having 1-8 C atoms or alkenoyl having 3-5 C atoms, or of copolymers thereof, wherein a monofunctional compound is added during the preparation of the polymer, or the polymer is reacted, after it has been prepared, with a monofunctional compound.

Condensation and addition polymers are understood as meaning those polymers which are prepared by polycondensation or polyaddition, for example polyesters, polyamides, polyurethanes, polyureas, polyethers, polyamines or polyaminotriazines.

Copolymers are to be understood as meaning those which comprise polymers of different types, for example polyester-amides, polyether-amines, polyamide-urethanes or polyester-urethanes, or those which comprise polymers of the same type but consist of different units, for example a polyester of a diol and two different dicarboxylic acids. In the copolymers at least one structural unit must contain a polyalkylpiperidine residue; the other structural unit can be free from polyalkylpiperidine residues.

The polyalkylpiperidine residues can be bonded to the residue of the polymer molecule by bonds of very diverse types, for example by C—C, N—C or O—C bonds. The piperidine ring can be bonded by 1, 2 or 3 bonds to the residue of the polymer molecule. The piperidine residues carry at least 4 alkyl groups and are preferably 2,2,6,6-tetramethylpiperidine residues. The substituent R' on the piperidine nitrogen is preferably hydrogen, alkyl having 1-6 C atoms, allyl, benzyl or acetyl.

The monofunctional compound used according to the invention for blocking the end groups can be, for example, a monocarboxylic acid or a functional derivative thereof, a monoalcohol or an alkali metal compound thereof, a primary or secondary monoamine, a cyclic anhydride of a dicarboxylic acid, a monoisocyanate, a monochlorotriazine or a monoepoxide.

Compounds preferably use are
1. a monocarboxylic acid or an ester, halide or anhydride thereof;
2. a monoalcohol or an alkali metal compound thereof;
3. a primary or secondary monoamine;
4. a monoisocyanate;
5. a cyclic anhydride of a dicarboxylic acid; or
6. a monochloro-1,3,5-triazine.

Examples of monocarboxylic acids or derivatives thereof which can be used according to the invention are acetic acid, acetyl chloride, acetic anhydride, methyl propionate, propionic anhydride, propionyl bromide, butyryl chloride, benzoyl chloride, ethyl benzoate, methyl pivalate and methyl 2-ethylcaproate.

Examples of alcohols or alkali metal compounds thereof which can be used are methanol, ethanol, isopropanol and sodium ethoxide or potassium tert.-butoxide. Preferably, however, higher alcohols are used, such as n-octanol, 2-ethoxyethanol, cyclohexanol, lauryl alcohol, stearyl alcohol, industrial mixtures of higher alcohols, benzyl alcohol and the like.

Examples of monoamines which can be used are dipropylamine, butylamine, dibutylamine, dodecylamine, cyclohexylamine or methyl-cyclohexylamine.

Examples of monoisocyanates which can be used are methyl isocyanate, n-octyl isocyanate, n-dodecyl isocyanate, phenyl isocyanate or cyclohexyl isocyanate.

Examples of cyclic anhydrides of dicarboxylic acids which can be used are phthalic anhydride, hexahydrophthalic anhydride, maleic anhydride, succinic anhydride or bicyclo[2.2.1]heptane-2,3-dicarboxylic acid anhydride.

Examples of monochlorotriazines which can be used are 2,4-diphenoxy-6-chloro-1,3,5-triazine, 2,4-bis-(dimethylamino)-6-chloro-1,3,5-triazine or 2-methyl-4-dibutylamino-6-chloro-1,3,5-triazine.

Examples of further monofunctional compounds which can be used for blocking the end groups are sulphonic acid chlorides, for example methanesulphonyl chloride, dodecane-1-sulphonyl chloride, benzenesulphonyl chloride or p-toluenesulphonyl chloride, monoepoxides, for example propylene oxide, 1-butene oxide, styrene oxide, butyl glycidyl ether or phenyl glycidyl ether, monochlorotriazines, for example 2-chloro-4,6-diethoxy-1,3,5-triazine or 2-chloro-4,6-bis-(diethylamino)-1,3,5-triazine, or monochlorosilanes, for example trimethylchlorosilane or triphenylchlorosilane.

The monofunctional compounds used can also be monofunctional derivatives of polyalkylpiperidines. For example 4-hydroxy-1,2,2,6,6-pentamethylpiperidine, 4-hydroxy-2,2,6,6-tetramethylpiperidine or 1-hydroxyethyl-2,2,6,6-tetramethylpiperidine can be used as a monoalcohol or 4-methyl-amino-1,2,2,6,6-pentamethylpiperidine or 4-(3'-aminopropoxy)-2,2,6,6-tetramethylpiperidine can be used as a monoamine. Furthermore, monofunctional triazines with piperidine substituents can be used, for example 2-chloro-4,6-bis-(2,2,6,6-tetramethyl-4-piperidylamino)-1,3,5-triazine, 2-chloro-4,6-bis-[N-(2,2,6,6-tetramethyl-4-piperidyl)-butylamino]-1,3,5-triazine or 2-chloro-4-tert.-octylamino-6-[N-(2,2,6,6-tetramethyl-4-piperidyl)- butylamino]-1,3,5-triazine. Under the customary conditions, the amino nitrogen of the piperidine ring does not react as a functional group, blocking an end group, so that the examples given above are to be regarded as monofunctional compounds in the sense of the invention.

The reaction conditions are determined by the conditions necessary for the polycondensation or polyaddition. The addition of the monofunctional compound which blocks the end groups can be made at the start of the polycondensation or polyaddition or in the course thereof or at the end thereof. Addition at the end of the polycondensation is equivalent to a reaction with the polymer after it has been prepared, without isolation of this polymer. In certain cases, however, it can also be advantageous or necessary first to isolate the polymer in which the end groups have not been blocked and to subject it to an after-treatment with the monofunctional compound in a separate reaction step.

It the two end groups in a polymer in which the end groups have not been blocked are of the same type, both end groups are blocked during the reaction with the monofunctional compound which blocks end groups. If the two end groups are different, a monofunctional compound which blocks both types of end groups can be used, or only one end group is blocked and the other is left unchanged, or two different monofunctional compounds are used.

If the monofunctional compound is added at the start or in a relatively early stage of the polymerisation, it can react quantitatively to block the end groups. The molecular weight of the blocked polymer depends on the amount of the monofunctional compound added. The amount of monofunctional compound used thus depends on the desired molecular weight. The lower the degree of polymerisation is to be, the greater is the amount of monofunctional compound which must be used.

If the monofunctional compound is added to the end of the polymerisation, there is in general no change in the degree of polymerisation already reached. The amount of the monofunctional compound which reacts is only that required for the reactive end groups present; the excess can be removed again by distillation or by precipitation and elution of the polymer. Thus, in such cases the amount of monofunctional compound used is not critical; the compound will be employed in excess.

However, it is also possible for the monofunctional compound to react with the polymer which has already formed, with reduction of the degree of polymerisation, for example in the case of transesterification of a polyester with a monoalcohol or a monocarboxylic acid alkyl ester. In this case, the amount of monofunctional compound used must again depend on the desired molecular weight of the polymer.

The invention also relates to the products of the process described, i.e. the condensation and addition polymers which have blocked end groups and can be used as light stabilisers and in which the recurring structural unit contains a polyalkylpiperidine residue of the formula

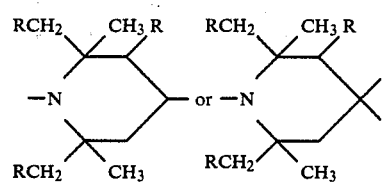

or is substituted by a polyalkylpiperidine side group of the formula

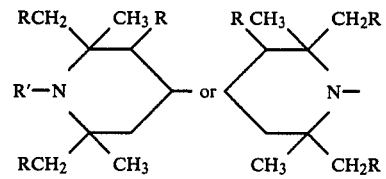

in which R is hydrogen or alkyl having 1-5 C atoms and R' is hydrogen, alkyl having 1-12 C atoms, alkenyl having 3-8 C atoms, alkynyl having 3-6 C atoms, aralkyl having 7-12 C atoms, alkanoyl having 1-8 C atoms or alkenoyl having 3-5 C atoms, and also the copolymers of such polymers with one another or with polyalkylpiperidine-free components, the end groups of the said polymers and copolymers having been blocked by the addition of a monofunctional compound during their preparation or by their subsequent reaction with a monofunctional compound.

Preferred polymers are polyesters, polyamides, polyurethanes, polyureas, polyethers, polyamines and polyaminotriazines, which contain polyalkylpiperidine residues.

Further preferred polymers are those containing polyalkylpiperidine residues in which R is hydrogen and R' is hydrogen, alkyl having 1-4 C atoms, allyl, benzyl or acetyl, especially H or $CH_3$.

Further preferred polymers are polyesters, polyamides and polyester-amides of the general formula VIII

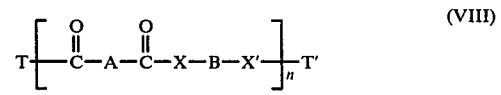
(VIII)

in which X and X' are oxygen or NY and Y is hydrogen, alkyl having 1-12 C atoms, cyclohexyl, aralkyl having 7-9 C atoms, phenyl or a polyalkylpiperidine residue, A and B are divalent organic radicals and at least one of A, B and Y contains a polyalkylpiperidine residue, n is a value from 2 to about 50, T is an end group of the formula $-OH$ or $-O(C_1-C_4\,alkyl)$ and T' is a blocked end group of the formula $-CO-R^3$, $-CO-NH-R^4$, $-SO_2-R^5$, $-CH_2CH(OH)R^6$ or $-CH_2CH(OH)-OH_2-O-R^7$, in which $R^3$, $R^4$, $R^5$, $R^6$ and $R^7$ are monovalent hydrocarbon radicals and especially in which $R^3$ is $C_1-C_{12}$-alkyl or phenyl, $R^4$ is $C_1-C_{12}$-alkyl, cyclohexyl or phenyl, $R^5$ is $C_1-C_4$-alkyl, phenyl or tolyl, $R^6$ is hydrogen, methyl, ethyl or phenyl and $R^7$ is $C_1-C_8$-alkyl, cyclohexyl or phenyl.

Such polymers of the formula VIII are formed by polycondensation of dicarboxylic acids or their alkyl esters with diols, diamines or aminoalcohols in a stoichiometric ratio and the simultaneous or subsequent addition of a monofunctional compound which introduces the radical T' as an end group.

Further preferred polymers are polyesters, polyamides and polyester-amides of the formula IX

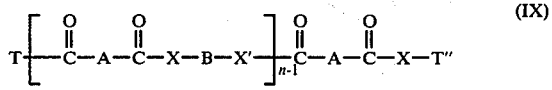

in which X, X', A, B, n and T are as defined above and T'' is a monovalent hydrocarbon residue, preferably $C_1$-$C_{12}$ alkyl, cyclohexyl, benzyl, phenyl or tolyl.

Such polymers of the formula IX are formed by polycondensation of n mols of a dicarboxylic acid or the ethyl esters thereof and (n−1) mols of a diol, diamine or aminoalcohol with 1 mol of a monohydroxy or monoamino compound T''—XH.

The condensation and addition polymers, having blocked end groups and containing polyalkylpiperidine residues, which are obtained by the process described can be used as light stabilisers for plastics and are distinguished by high stability to extraction. Polymeric substrates which can be stabilised in this way against photodegradation are, for example, those which follow:

1. Polymers of mono- and di-olefins, for example polyethylene (which can be crosslinked), polypropylene, polyisobutylene, polymethylbut-1-ene, polymethylpent-1-ene, polyisoprene or polybutadiene.

2. Mixtures of the polymers mentioned under (1), for example mixtures of polypropylene with polyethylene or with polyisobutylene.

3. Copolymers of mono- and di-olefins, for example ethylene-propylene copolymers, propylene-but-1-ene copolymers, propylene-isobutylene copolymers and ethylene-but-1-ene copolymers, and also terpolymers of ethylene with propylene and a diene, such as hexadiene, dicyclopentadiene or ethylidenenorbornene.

4. Polystyrene.

5. Copolymers of styrene or α-methylstyrene with dienes or acrylic derivatives, for example styrene-butadiene and styrene-acrylonitrile, and styrene-acrylonitrile-methyl acrylate; mixtures of high impact strength obtained from styrene copolymers and another polymer, for example a polyacrylate, a diene polymer or an ethylene-propylene-diene terpolymer; and also block copolymers of styrene, for example styrene-butadiene-styrene, styrene-isoprene-styrene or styrene-ethylene/butylene-styrene.

6. Graft copolymers of styrene, for example styrene on polybutadiene, styrene and acrylonitrile on polybutadiene and also mixtures thereof with the copolymers mentioned under (5), such as are known as so-called ABS polymers.

7. Halogen-containing polymers, for example polyvinyl chloride, polyvinylidene chloride, polyvinyl fluoride, polychloroprene, chlorinated rubbers and copolymers such as vinyl chloride/vinylidene chloride, vinyl chloride/vinyl acetate or vinylidene chloride/vinyl acetate.

8. Polymers which are derived from α,β-unsaturated acids and their derivatives, such as polyacrylates and polymethacrylates, polyacrylamides and polyacrylonitrile.

9. Polymers which are derived from unsaturated alcohols and amines or their acyl derivatives or acetals, such as polyvinyl alcohol, polyvinyl acetate, polyvinyl stearate, polyvinyl benzoate, polyvinyl maleate, polyvinylbutyral, polyallyl phthalate, polyallylmelamine and their copolymers with other vinyl compounds, such as ethylene/vinyl acetate copolymers.

10. Homopolymers and copolymers of epoxides, such as polyethylene oxide, polypropylene oxide or their copolymers with bis-glycidyl ethers.

11. Polyacetals, such as polyoxymethylene, and also those polyoxymethylenes which contain ethylene oxide as a comonomer.

12. Polyphenylene oxides.

13. Polyurethanes and polyureas.

14. Polycarbonates.

15. Polysulphones.

16. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

17. Polyesters which are derived from dicarboxylic acids and dialcohols and/or from hydroxycarboxylic acids or the corresponding lactones, such as polyethylene terephthalate, polybutylene terephthalate and poly-1,4-dimethylol-cyclohexane terephthalate, and also block polyether-esters which are derived from polyethers having hydroxyl end groups and dicarboxylic acids.

18. Crosslinked polymers which are derived from aldehydes on the one hand and phenols, ureas and melamines on the other, such as phenol-formaldehyde, urea-formaldehyde and melamine-formaldehyde resins.

19. Alkyd resins, such as glycerol-phthalic acid resins and their mixtures with melamine-formaldehyde resins.

20. Unsaturated polyester resins which are derived from copolyesters of saturated and unsaturated dicarboxylic acids with polyhydric alcohols, with vinyl compounds as crosslinking agents, and also their halogen-containing modifications of low inflammability.

21. Crosslinked epoxide resins which are derived from polyepoxides, for example from bis-glycidyl ethers or from cycloaliphatic diepoxides.

22. Natural polymers, such as cellulose, rubber, proteins and their polymer-homologously chemically modified derivatives, such as cellulose acetates, cellulose propionates and cellulose butyrates, or the cellulose ethers, such as methylcellulose.

Amongst these polymers, groups 1–6, 13, 16 and 17 are preferred since the stabilisers according to the invention have a particularly pronounced effect in these substrates.

The polymeric stabilisers are incorporated in the substrates in a concentration from 0.005 to 5% by weight, calculated relative to the material to be stabilised.

Preferably, 0.01 to 1.0, and particularly preferentially 0.02 to 0.5, % by weight of the compounds, calculated relative to the material to be stabilised, is incorporated into the latter. The incorporation can take place, for example, by mixing in at least one of the polymeric light stabilisers and, if desired, further additives according to the methods customary in the art, before or during shaping, or by applying the dissolved or dispersed compounds to the polymer, if appropriate with subsequent evaporation of the solvent.

The invention therefore also relates to plastics stabilised by the addition of 0.005 to 5% by weight of a polymeric polyalkylpiperidine derivative with end groups blocked according to the invention. These plastics can be used in very diverse forms, for example as films, fibres, tapes or profiles or as binders for lacquers, adhesives or putties.

The plastic stabilised in this way can also contain yet further stabilisers or other additives customary in plastics technology, such as those listed, for example, in German Offenlegungsschrift No. 2,349,962 on pages 25-32.

When known stabilisers are also used, synergistic effects can arise and this is frequently the case especially when other light stabilisers or organic phosphites are also used.

The additional use of antioxidants when stabilising polyolefins is of particular importance.

The examples which follow illustrate the invention in more detail without restricting it. The temperatures are given in degrees centigrade.

EXAMPLE 1

201.3 g of 1-(2-hydroxyethyl)-2,2,6,6-tetramethyl-4-hydroxy-piperidine are warmed with 146.1 g of dimethyl succinate and 3 g of tetrabutyl orthotitanate in 200 ml of xylene at 130°-135° for 24 hours under a gentle stream of nitrogen and during this time methanol is slowly distilled off. The reaction mixture is allowed to cool to about 100°, 17.2 g of methyl 2-ethyl-2-methyl-caproate and 0.5 g of tetrabutyl orthotitanate are added and the mixture is stirred for a further 8 hours at 130°-35°, the methanol formed being distilled off. The reaction mixture is then poured at about 80° into 2 liters of methanol, with stirring. The resulting suspension is stirred for 2 hours at room temperature and filtered and the residue is washed with 500 ml of methanol and then dried in vacuo at 80° for 72 hours. The resulting polyester is a colourless powder having an average molecular weight $\overline{M}_w$ of 4,750 (gel chromatography) and a softening point of 120°-130°.

If 15.8 g of methyl 2-ethyl-caproate are used in place of methyl 2-ethyl-2-methyl-caproate and in other respects the procedure is as described above, a colourless polyester having an average molecular weight $\overline{M}_w$ of 3,000 (gel chromatography) and a softening point of 106°-116° is obtained.

EXAMPLE 2

201.3 g of 1-(2-hydroxyethyl)-2,2,6,6-tetramethyl-4-hydroxy-piperidine are warmed with 146.1 g of dimethyl succinate and 3 g of tetrabutyl orthotitanate in 200 ml of xylene at 130°-35° for 24 hours under a gentle stream of nitrogen and during this time methanol is slowly distilled off. The reaction mixture is diluted with 100 ml of xylene and cooled to 50°. A solution of 10 g of butyl isocyanate in 50 ml of xylene is added dropwise at this temperature in the course of 10 minutes and the temperature is then raised to 130° in the course of 2 hours. After cooling the reaction mixture to about 80°, it is poured into 2.5 liters of methanol. The resulting suspension is stirred for 3 hours at room temperature and filtered and the residue is washed with 500 ml of methanol and dried in vacuo at 80° for 72 hours. The resulting polyester is a colourless powder having an average molecular weight $\overline{M}_w$ of 7,300 (gel chromatography) and a softening point of 120°-128°.

If 12 g of phenyl isocyanate are used in place of butyl isocyanate and in other respects the procedure is as described above, a colourless polyester having an average molecular weight $\overline{M}_w$ of 6,900 (gel chromatography) and a softening point of 115°-135° is obtained.

EXAMPLE 3

201.3 g of 1-(2-hydroxyethyl)-2,2,6,6-tetramethyl-4-hydroxypiperidine are warmed with 146.1 g of dimethyl succinate and 3 g of tetrabutyl orthotitanate in 200 ml of xylene at 130°-135° for 24 hours under a stream of nitrogen and during this time methanol is slowly distilled off. The reaction mixture is diluted with 200 ml of xylene and cooled to about 70° and is then poured slowly into 3,000 ml of methanol, with stirring. The resulting precipitate is filtered off, washed with 300 ml of methanol and dried in vacuo at 50°-60°. The resulting polyester has a molecular weight of 4,050 (vapour pressure osmometry).

40.5 g of this polyester are heated with 1.85 g of n-dodecylamine at 200° for 6 hours, under a gentle stream of nitrogen. After cooling, the reaction product is taken up in about 200 ml of toluene, the mixture is filtered to remove a small amount of insoluble particles and the toluene solution is then completely evaporated in vacuo. A glassy mass is obtained and after cooling this can be pulverised. The resulting amide-modified polyester is a slightly yellowish powder with an average molecular weight (vapour pressure osmometry) of 2,960 and a softening point of about 55°.

If 40.5 g of the polyester prepared above are reacted with 1.84 g of 2,2,6,6-tetramethyl-4-β-aminoethylpiperidine instead of with n-dodecylamine and in other respects the procedure is as described above, a polyester with amide end groups is obtained in the form of a slightly yellowish powder with an average molecular weight (vapour pressure osmometry) of 2,400 and a softening point of 65°-70°.

EXAMPLE 4

100.7 g of 1-hydroxyethyl-2,2,6,6-tetramethyl-4-hydroxypiperidine, 7.5 g of methyl stearate, 87.5 g of dimethyl terephthalate and 1.5 g of tetrabutyl orthotitanate are heated in 300 ml of xylene under a stream of nitrogen. At about 120° a clear solution forms and methanol starts to distil off. The reaction mixture is kept at 130°-135° for 10 hours until virtually no further methanol distils off. The reaction mixture is poured into 1,500 ml of methanol, with good stirring. The colourless precipitate is filtered off, washed with 300 ml of methanol and dried in vacuo at 80°. The resulting polyester, which is modified with stearic acid ester end groups, is a colourless powder with an average molecular weight (vapour pressure osmometry) of 2,300 and a softening point of 245°-250°.

If an identical amount of dimethyl isophthalate is used in place of the dimethyl terephthalate and in other respects the procedure is as described above, a polyester with modified end groups is obtained in the form of a colourless powder with an average molecular weight of 2,250 and a softening point of 120°-30°.

EXAMPLE 5

100.7 g of 1-hydroxyethyl-2,2,6,6-tetramethyl-4-hydroxypiperidine, 82.7 g of dimethyl adipate, 3.4 g of methyl benzoate and 2.0 g of sodium methylate are warmed slowly in 200 ml of xylene under a gentle stream of nitrogen. At about 120° the transesterification starts and methanol distils off. The reaction mixture is stirred for 10 hours at 130°-35° and is diluted with 300 ml of toluene and the resulting slightly brownish solution is clarified. This solution is evaporated, the residue is dried for 12 hours under a high vacuum and the resulting slightly brownish mass is powdered after it has been obtained. The resulting polyester, which is modified with benzoic acid ester end groups, has an average molecular weight (vapour pressure osmometry) of 2,500 and softens at 45°–50°.

EXAMPLE 6

85.5 g of 1-hydroxyethyl-2,2,6,6-tetramethyl-4-hydroxypiperidine, 14.0 g of lauryl alcohol, 97.1 g of dimethyl terephthalate and 2.0 g of tetrabutyl orthotitanate are heated in 300 ml of xylene under a gentle stream of nitrogen. At about 120° methanol starts to distil off. The reaction mixture is stirred for 8 hours at 130°–135° until virtually no further methanol distils off and, after cooling, is poured into 1,500 ml of methanol. The resulting colourless precipitate is filtered off, washed with 200 ml of methanol and dried in vacuo at 80°. The resulting polyester, with modified end groups, is a colourless powder with an average molecular weight (vapour pressure osmometry) of 2,270 and a softening point of 180°.

If an identical amount of dimethyl isophthalate is used in place of the dimethyl terephthalate and in other respects the procedure is as described above, a polyester with modified end groups is obtained in the form of a slightly yellowish powder with an average molecular weight of 2,160 and a softening point of 120°–30°.

EXAMPLE 7

Cyanuric chloride is reacted with tert.-octylamine (1,1,3,3-tetramethylbutylamine) in the conventional manner to give 2,4-dichloro-6-tert.-octylamine-1,3,5-triazine. Melting point 80°–81° after crystallisation from hexane.

A mixture of 11.1 g of 2,4-dichloro-6-tert.-octylamino-1,3,5-triazine, 19.7 g of 1,6-bis-(2,2,6,6-tetramethyl-4-piperidylamino)-hexane, 3.2 g of finely powdered sodium hydroxide and 200 ml of toluene is boiled under reflux for 24 hours, with good stirring. 9.6 g of 2-chloro-4,6-bis-[N-(2,2,6,6-tetramethyl-4-piperidyl)-ethylamino]-1,3,5-triazine and 1 g of finely powdered sodium hydroxide are then added and the batch is boiled for a further 24 hours. The mixture is filtered. The filtrate is evaporated and the solid product is crystallised from hexane.

Similar products are obtained when, in the above example, equivalent amounts of acetyl chloride, pivalic acid chloride, benzoyl chloride, dimethylcarbamic acid chloride or p-toluenesulphonyl chloride are used in place of the 2-chloro-4,6-bis-[N-(2,2,6,6-tetramethyl-4-piperidyl)-ethylamino]-1,3,5-triazine.

What is claimed is:

1. A condensation or addition polymer selected from the group consisting of a polyester, polyamide, polyurethane, polyurea, polyether, polyamine or polyaminotriazine which has blocked end groups and can be used as a light stabiliser and in which the recurring structural unit contains a polyalkylpiperidine residue of the formula

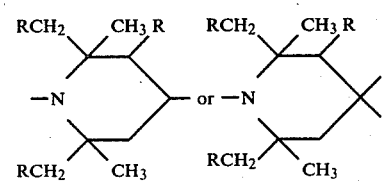

or is substituted by a polyalkylpiperidine side group of the formula

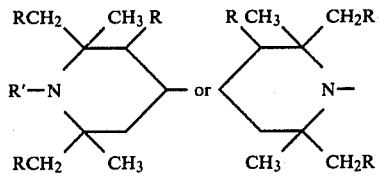

in which R is hydrogen or alkyl having 1–5 C atoms and R' is hydrogen, alkyl having 1–12 C atoms, alkenyl having 3–8 C atoms, alkynyl having 3–6 C atoms, aralkyl having 7–11 C atoms, alkanoyl having 1–8 C atoms or alkenoyl having 3–5 C atoms, or a copolymer of such polymers with one another or with a polyalkylpiperidine-free component, the end groups of the said polymer or copolymer having been blocked by the addition of a monofunctional compound during its preparation or by its subsequent reaction with a monofunctional compound.

2. A polymer according to claim 1, in which R is hydrogen and R' is hydrogen, alkyl having 1–4 C atoms, allyl, benzyl or acetyl.

3. A polymer according to claim 2, in which R is hydrogen and R' is hydrogen or methyl.

4. A polymer according to claim 1, which is a polyester, polyamide or polyester-amide of the general formula VIII

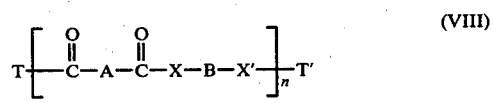

in which X and X' are oxygen or NY and Y is hydrogen, alkyl having 1–12 C atoms, cyclohexyl, aralkyl having 7–9 C atoms, phenyl or a polyalkylpiperidine residue, A and B are divalent organic residues and at least one of A, B and Y contains a polyalkylpiperidine residue, n is a value from 2 to about 50, T is an end group of the formula —OH or —O($C_1$–$C_4$ alkyl) and T' is a blocked end group of the formula —CO—$R^3$, —CO—NH—$R^4$, —$SO_2$—$R^5$, —$CH_2$CH(OH)$R^6$ or —$CH_2$CH(OH)—$CH_2$—O—$R^7$, in which $R^3$, $R^4$, $R^5$, $R^6$ and $R^7$ are monovalent hydrocarbon residues.

5. A polymer according to claim 4, wherein, in the formulae for the blocked end groups, $R^3$ is alkyl having 1–12 C atoms or phenyl, $R^4$ is alkyl having 1–12 C atoms, cyclohexyl or phenyl, $R^5$ is alkyl having 1–4 C atoms, phenyl or tolyl, $R^6$ is hydrogen, methyl, ethyl or phenyl and $R^7$ is alkyl having 1–8 C atoms, cyclohexyl or phenyl.

6. A polymer according to claim 1, of the formula (IX)

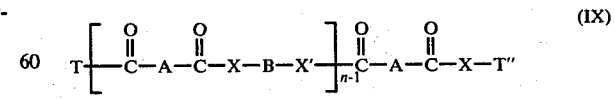

in which X and X' are oxygen or NY and Y is hydrogen, $C_1$–$C_{12}$ alkyl, cyclohexyl, $C_7$–$C_9$ aralkyl, phenyl or a polyalkylpiperidine residue, A and B are divalent organic residues and at least one of A, B and Y contains a polyalkylpiperidine residue, n is a value from 2 to about 50, T is an end group of the formula —OH or —O(C-

$_1$–C$_4$ alkyl) and T" is a monovalent hydrocarbon residue.

7. A polymer according to claim 6, of the formula IX, in which T" is alkyl having 1–12 C atoms, cyclohexyl, benzyl, phenyl or tolyl.

8. A polymer according to claim 1 which is a polyester.

* * * * *